United States Patent
Ortlano et al.

(10) Patent No.: US 6,294,013 B1
(45) Date of Patent: Sep. 25, 2001

(54) POLYSACCHARIDE PIGMENT DISPERSIONS

(75) Inventors: D. Mark Ortlano, Cincinnati, OH (US); Lori Lewis, West Haven, CT (US); Christopher J. Vissing, Amelia; Joseph P. LaBazzo, Sr., Mason, both of OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/457,249

(22) Filed: Dec. 8, 1999

(51) Int. Cl.⁷ .................. C09B 67/00; C09B 67/02; C09B 63/00
(52) U.S. Cl. .................. 106/499; 106/402; 106/500; 106/501.1
(58) Field of Search .................. 106/402, 499, 106/500, 501.1

(56) References Cited

U.S. PATENT DOCUMENTS

| | | | |
|---|---|---|---|
| 4,323,396 | 4/1982 | Ehl et al. | 106/23 |
| 4,475,919 | 10/1984 | Woznicki et al. | 8/518 |
| 4,652,313 | 3/1987 | Den Boer et al. | 106/289 |
| 5,059,248 | 10/1991 | Signorino et al. | 106/402 |
| 5,169,436 * | 12/1992 | Matrick | 106/31.58 |
| 5,324,349 | 6/1994 | Sano et al. | 106/25 R |
| 5,753,021 | 5/1998 | Martin | 106/31.68 |
| 5,948,419 * | 9/1999 | Bankert et al. | 424/401 |

FOREIGN PATENT DOCUMENTS

| | | | |
|---|---|---|---|
| WO 94/24169 | 10/1994 | (WO) | C08D/11/15 |
| WO 97/18267 | 5/1997 | (WO) | C08L/91/06 |
| WO97/26803 | 7/1997 | (WO) | A23L/1/275 |

OTHER PUBLICATIONS

Lorama Chemicals, Inc., Introduction to the Use of Polysaccharide Resins in Universal Pigment Dispersions for Low VOC In–Plant Grind Pastes In–Plant Tint Pastes In–Store Tint Pastes, May 1995.

* cited by examiner

*Primary Examiner*—Anthony Green
(74) *Attorney, Agent, or Firm*—Sidney Persley

(57) ABSTRACT

An aqueous pigment dispersion containing at least one FD&C and/or D&C pigment dispersed in water and a polysaccharide resin optionally in combination with a styrene-acrylic resin and ethylenediaminetetraacetic acid. The dispersion offers excellent viscosity and settling stability to pH-sensitive FD&C and D&C pigments together with good color value.

21 Claims, No Drawings

POLYSACCHARIDE PIGMENT DISPERSIONS

BACKGROUND OF THE INVENTION

1. Field of the Invention

The invention relates to a viscosity stable aqueous dispersion suitable for coloring water-based cosmetics, paper coatings and inks for food packaging. More particularly, the present invention relates to an aqueous dispersion which contains at least one Food, Drug and Cosmetic ("FD&C") and/or Drug and Cosmetic ("D&C") pigment dispersed in water with a polysaccharide resin.

2. Related Art

Only pigments which have been certified for cosmetics or direct food contact can be used for coloration of water-based cosmetics, food and food packaging such as candy wrappers. Common pigments used in cosmetics include: D&C Red 6 (Disodium Salt), D&C Red 6 (Barium Lake), D&C Red 7 (Calcium Lake), FD&C Yellow 5 (Aluminum Lake), FD&C Yellow 6 (Aluminum Lake), FD&C Yellow 10 (Aluminum Lake) and FD&C Blue I (Aluminum Lake). These above-mentioned pigments are salts of the corresponding FD&C and D&C dyes.

The FD&C dyes and the D&C dyes all have functional sites, such as carboxylic groups or sulfonates, which provide excellent water solubility. However, water solubility can lead to undesirable problems such as dye bleeding and staining. To prevent these problems, FD&C dyes and D&C dyes are made water insoluble by converting ("laking") their functional sites to salts with metal ions, such as sodium, barium, calcium or aluminum.

The formulator is faced with a dilemma because, while it is desirable for the pigments to be water insoluble once applied to the cosmetic or food packaging, it is also important for the pigment to be evenly distributed during printing or coloration of the cosmetic or food packaging. In short, the formulator must be able to evenly disperse the water-insoluble laked FD&C and D&C pigments in water in order to apply them.

Dispersion of these FD&C pigments into water presents a difficult challenge. The laked pigments contain large amounts of metal ions, such as aluminum, barium or calcium, which can cause very large viscosity increases in aqueous systems. For example, aluminum ion forms aluminum hydroxide in water, in which a number of water molecules are "attached" or hydrated to the aluminum ion. Given enough aluminum ions, water can eventually gel completely due to the water of hydration and also to the structuring of the neighboring water molecules via hydrogen bonding.

Alkali-sensitive styrene-acrylic resins are commonly used in printing inks for dispersion of industrial organic pigments (such as phthalocyanine blue, diarylide yellow or carbon black). However, these acrylics are not effective in stabilizing FD&C or D&C pigments in water by themselves, and can aggravate the gellation problem since the aluminum ions can attach themselves to the acrylate functionality, and because styrene acrylic resins become water insoluble at low pH.

U.S. Pat. No. 5,059,248 discloses an aqueous dispersion composition which includes FD&C or D&C pigment and a salt of ethylenediaminetetracetic acid or nitrilo triacetic acid as a stabilizing agent. The dispersion may additionally contain a lower alkanol and/or a water soluble plasticizer. Film-forming resins such as methyl cellulose, hydroxypropylmethyl cellulose, ethyl cellulose, cellulose acetate phthalate, shellac and polyvinyl pyrrolidone may also be included in the aqueous dispersion.

U.S. Pat. No. 4,652,313 discloses aqueous lake pigment suspensions which include FD&C lakes, a polymeric colloid such as gum arabic, guar gum, agar, xantham gum, PG alginate, hydroxypropyl cellulose, and polymeric colloids such as corn starch or polyvinylpyrrolidone may be included in the suspension.

U.S. Pat. No. 5,753,021 discloses pigmented ink jet ink compositions which contain modified polysaccharide resin, a carrier and a pigment. "Universal Pigment Dispersions," a brochure from Lorama Chemicals, Inc., discloses aqueous dispersions containing polysaccharide resin, styrene acrylate and ethylenediaminetetraacetic acid for use in paint compositions.

An object of the present invention is to provide an aqueous pigment dispersion containing FD&C and/or D&C pigments which will uniformly color food packaging, and will not bleed or stain once deposited.

SUMMARY OF THE INVENTION

In one aspect, the present invention relates to an aqueous pigment dispersion, comprising
  (i) a pigment selected from FD&C pigments and D&C pigments;
  (ii) a polysaccharide resin; and
  (iii) water.

In another aspect, the present invention relates to a process for preparing an aqueous dispersion, comprising
  (i) homogenizing a FD&C or D&C pigment, a polysaccharide resin and water to form a premix, and
  (ii) milling the premix until the mean particle size distribution of the pigment is less than one micron.

A feature of the aqueous dispersion of the present invention is the combination of at least one FD&C or D&C pigment and a polysaccharide.

An advantage of the aqueous dispersion of the present invention is that it is stable and does not exhibit an increase in viscosity over time.

DETAILED DESCRIPTION OF THE PREFERRED EMBODIMENTS

The pigment employed in the present invention may be any FD&C or D&C pigment. Preferred FD&C pigments include FD&C Red No. 40, FD&C Yellow No. 5, FD&C Yellow No. 6 and FD&C Blue No. 1. Preferred D&C pigments include D&C Red No. 6, D&C Red No. 7, D&C Red No. 21, D&C Red No. 22, D&C Red No. 27, Red No. 28, D&C Red No. 30, D&C Red No. 33, D&C Red No. 34, D&C Red No. 36, D&C Orange No. 5 and D&C Yellow No. 10. All of these pigments are commercially available.

The polysaccharide resin should not have functional groups that would be affected by the metal ions of the laked pigments. In addition, the polysaccharide resin should readily form a film and exhibit excellent water resistance. Preferred polysaccharide resins include corn starch, cellulose and hydroxypropyl cellulose. A particularly preferred polysaccharide resin is JA-250-3, commercially available from Lorama Chemicals Inc., Milton Ontario, Canada, which contains 43% polysaccharide resin, 3% propylene glycol and 54% water. This resin has a pH of 6.8, a MFFT of 1.0° C. and a glass transition temperature of 94.0° C. The polysaccharide resin contained in this product is believed to be corn starch having a number average molecular weight of 500,000 to 2,500,000.

A styrene-acrylic resin may optionally be included in the aqueous dispersion of the present invention. The styrene-acrylic resin may be any styrenated acrylic resin which assists in the dispersal of the pigment in water. Suitable styrene-acrylic resins include styrene/acrylic acid copolymer, styrene/acrylic acid/alkyl acrylate copolymer, styrene/ methacrylic acid copolymer, and styrene/ methacrylic acid/alkyl acrylate copolymer. A particularly preferred styrene-acrylate resin is Joncryl 67, commercially available from S. C. Johnson, Racine, Wis.

The aqueous dispersion of the present invention may be prepared using commercially available equipment and known techniques. A particularly preferred process for preparing the aqueous dispersion includes (i) homogenizing a pigment selected from the group consisting of FD&C pigments and D&C pigments, a polysaccharide resin and water to form a premix, and (ii) milling the premix until a mean value of a particle size distribution of the pigment is less than one micron.

The aqueous pigment dispersion may contain from about 10 to about 35, preferably 15 to 30, weight percent of pigment, based on the total weight of the dispersion. The polysaccharide resin may be present in an amount of from about 5 to about 45, preferably 10 to 40, weight percent, based on the total weight of the dispersion. The dispersion may optionally contain from about 1 to about 40, preferably 1 to 25 weight percent of styrene-acrylic resin, based on the total weight of the dispersion.

The aqueous pigment dispersion may optionally contain other compounds assuming they do not detract from the desirable properties of the dispersion. For example, the aqueous dispersion may also contain a water-soluble organic co-solvent. Suitable co-solvents include alkanols (methanol, ethanol, n-propanol, isopropanol, n-butanol, sec-butanol, and tert-butanol), polyhydric alcohols (ethylene glycol, diethylene glycol, triethylene glycol, propylene glycol, tetraethylene glycol, polyethylene glycol and glycerol) and alkanolamines (monoethanolamine, diethanolamine and triethanolamine).

Another optional compound which may be included in the aqueous pigment dispersion is a ligand to reduce aluminum hydroxide formation. Suitable ligands include ethylenediaminetetraacetic acid and its salts.

The following examples illustrate preferred embodiments of the invention, and are not intended to limit the scope of the invention in any manner whatsoever.

EXAMPLE 1

The components listed below were mixed in a homogenizer for a period of 15 minutes to produce a premix:

26.0% D&C Red No. 7 (C19-011, Calcium lake, 38% dye content, Sun Chemical), 20.0% A250-3™ polysaccharide resin solution (Lorama Chemicals Inc.), 13.0% Joncryl™ 67 styrene acrylate resin solution (SC Johnson)

18.0% propylene glycol, and 23.0% distilled water.

The resulting premix was milled for 18 minutes in an Eiger™ mini-mill in recirculation mode at a temperature of 75° F.–90° F. The initial viscosity of the resulting dispersion was 50 cps and stayed at this same value for at least two months at room temperature.

EXAMPLE 2

Comparative

Following the general procedures of Example 1, an aqueous dispersion was prepared from the following components without a polysaccharide:

35.0% D&C Red No. 7 (C19-011, Calcium lake, 38% dye content, Sun Chemical), 8.75% Joncryl 67™ styrene acrylate resin solution and 56.25% water.

Ammonia was added to solubilize the resin and to ensure a pH greater than 8.0.

The resulting dispersion completely gelled. Water was added to the millbase to lower (total and pigment) solids, but complete gellation of that dispersion also occurred. Even the addition of larger amounts of water, resulting in low pigment loadings of from 20% to 30%, did not increase the dispersion's stability.

EXAMPLE 3

Following the general procedures of Example 1, an aqueous dispersion was prepared from the following components:

29.0% D&C Red No. 6 (C19-012, Barium lake, 42% dye content, Sun Chemical), 27.0% Joncryl 67™ styrene acrylate resin solution, 10.0% JA250-3™ polysaccharide resin solution, 9.0% propylene glycol, and 25.0% water.

The initial viscosity of this dispersion was 300 cps and only increased to 400 cps after aging for two months at room temperature.

EXAMPLE 4

Following the general procedures of Example 1, an aqueous dispersion was prepared from the following components:

26.0% FD&C Yellow No. 5 (C69-4537, Aluminum lake, 43% dye content, Sun Chemical), 30.0% JA250-3™ polysaccharide resin solution, 10.0% propylene glycol, and 34.0% water.

The initial viscosity of this dispersion was 2770 cps. The viscosity did not change after three weeks of aging at room temperature, and after three days of oven aging at 49° C.

EXAMPLE 5

Comparative

Following the general procedures of Example 1, an aqueous dispersion was prepared from FD&C Yellow No. 5 and Joncryl 67 styrene acrylate resin solution, but without the addition of a polysaccharide. Although many different combinations were attempted, the pH and viscosity of the resulting dispersions were very unstable.

EXAMPLE 6

Following the general procedures of Example 1, an aqueous dispersion was prepared from the following components:

16.0% D&C Yellow No. 10 (C71-5171, Aluminum lake, 17% dye content, Sun Chemical), 37.0% JA250-3™ polysaccharide resin solution, 10.0% propylene glycol, and 37.0% water.

The initial viscosity of this dispersion was 1220 cps, which increased to 8000 cps after three days of room temperature. However, this viscosity was thixotropic.

EXAMPLE 7

Following the general procedures of Example 6, an aqueous dispersion was prepared from the following components:

16.0% D&C Yellow No. 10 (C71-5171, Aluminum lake, 17% dye content, Sun Chemical), 37.0% JA250-3™ polysaccharide resin solution, 10.0% propylene glycol, 1.0% ethylenediaminetetraacetic acid, and 36.0% water.

The initial viscosity of this dispersion was 1230 cps, which dropped to 544 cps after ten days of room temperature aging. Without wishing to be bound by theory, the applicants currently believe EDTA chelates the aluminum, thereby reducing aluminum hydroxide formation.

EXAMPLE 8

Following the general procedures of Example 1, an aqueous dispersion was prepared from the following components:

16.0% FD&C Blue No. 1

36.0% JA250-3™ polysaccharide resin solution, 8.0% propylene glycol, and 40.0% water.

The initial viscosity of this dispersion was poor. However, the addition of 0.5% EDTA provided a dispersion having an initial viscosity of 3790, which dropped to 2410 cps after four days aging at room temperature. A corresponding dispersion containing 1.0% EDTA had an initial viscosity of 3350 cps, which dropped to 1900 cps after four days aging at room temperature.

The present invention has been described in detail, including the preferred embodiments thereof. However, it will be apparent to those of skill in the art, upon consideration of the present disclosure, that the invention is capable of numerous modifications, substitutions, rearrangements of parts and/or improvements without departing from the spirit and scope of the invention.

What is claimed is:

1. An aqueous pigment dispersion, comprising
   (i) a pigment selected from the group consisting of FD&C pigments and D&C pigments;
   (ii) a polysaccharide resin dispersant; and
   (iii) water.

2. The dispersion of claim 1, wherein said pigment is a FD&C pigment.

3. The dispersion of claim 2, wherein said FD&C pigment is selected from the group consisting of FD&C Red No. 40, FD&C Yellow No. 5, FD&C Yellow No. 6 and FD&C Blue No. 1.

4. The dispersion of claim 1, wherein said pigment is a D&C pigment.

5. The dispersion of claim 4, wherein said D&C pigment is selected from the group consisting of D&C Red No. 6, D&C Red No. 7, D&C Red No. 21, D&C Red No. 22, D&C Red No. 27, D&C Red No. 28, D&C Red No. 30, D&C Red No. 33, D&C Red No. 34, D&C Red No. 36, D&C Orange No. 5 and D&C Yellow No. 10.

6. The dispersion of claim 1, wherein said polysaccharide resin is selected from the group consisting of corn starch, cellulose and hydroxypropyl cellulose.

7. The dispersion of claim 1, wherein said pigment is present in an amount ranging from about 10 to about 35 weight percent based on the total weight of the dispersion.

8. The dispersion of claim 7, wherein said pigment is present in an amount ranging from about 15 to about 30 weight percent based on the total weight of the dispersion.

9. The dispersion of claim 1, wherein said polysaccharide resin is present in an amount ranging from about 5 to about 45 weight percent based on the total weight of the dispersion.

10. The dispersion of claim 9, wherein said polysaccharide resin is present in an amount ranging from about 10 to 40 weight percent based on the total weight of the dispersion.

11. The dispersion of claim 1, further comprising a styrene-acrylic resin.

12. The dispersion of claim 1, wherein said styrene-acrylic resin is selected from the group consisting of styrene/acrylic acid copolymer, styrene/acrylic acid/alkyl acrylate copolymer, styrene/methacrylic acid copolymer, styrene/methacrylic acid/alkyl acrylate copolymer.

13. The dispersion of claim 11, wherein said styrene-acrylic resin is present in an amount ranging from about 1 to 40 weight percent based on the total weight of the dispersion.

14. The aqueous pigment dispersion of claim 13, wherein said styrene-acrylic resin is present in an amount ranging from about 1 to 25 weight percent based on the total weight of the dispersion.

15. The dispersion of claim 1, further comprising a water-soluble organic co-solvent selected from the group consisting of alkanols, polyhydric alcohols and alkanolamines.

16. The dispersion of claim 15, wherein said co-solvent is an alkanol selected from the group consisting of methanol, ethanol, n-propanol, isopropanol, n-butanol, sec-butanol, and tert-butanol.

17. The dispersion of claim 15, wherein said co-solvent is a polyhydric alcohol selected from the group consisting of ethylene glycol, diethylene glycol, triethylene glycol, propylene glycol, tetraethylene glycol, polyethylene glycol and glycerol.

18. The dispersion of claim 15, wherein said co-solvent is an alkanolamine selected from the group consisting of monoethanolamine, diethanolamine and triethanolamine.

19. The dispersion of claim 1, further comprising a ligand.

20. The dispersion of claim 19, wherein said ligand is ethylenediaminetetraacetic acid or a salt thereof.

21. A process for preparing aqueous pigment dispersion, comprising
   (i) homogenizing a pigment selected from the group consisting of FD&C pigments and D&C pigment; a polysaccharide resin dispersant and water to form a premix, and
   (ii) milling said premix until the mean particle size distribution of the pigment is less than one micron.

* * * * *

UNITED STATES PATENT AND TRADEMARK OFFICE
CERTIFICATE OF CORRECTION

| | | |
|---|---|---|
| PATENT NO. | : 6,294,013 B1 | Page 1 of 1 |
| DATED | : September 25, 2001 | |
| INVENTOR(S) | : D. Mark Ortalano et al. | |

It is certified that error appears in the above-identified patent and that said Letters Patent is hereby corrected as shown below:

<u>Title page,</u>
Item [75], "Amella" should read -- Amelia --.

Signed and Sealed this

Twenty-fifth Day of June, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO. : 6,294,013 B1  Page 1 of 1
DATED : September 25, 2001
INVENTOR(S) : D. Mark Ortalano et al.

It is certified that error appears in the above-identified patent and that said Letters Patent is hereby corrected as shown below:

<u>Title page,</u>
Items [12] and [75], "Ortlano" should read -- Ortalano --.

Signed and Sealed this

Fifteenth Day of October, 2002

Attest:

Attesting Officer

JAMES E. ROGAN
*Director of the United States Patent and Trademark Office*